United States Patent [19]
Harandi et al.

[11] Patent Number: 5,830,346
[45] Date of Patent: Nov. 3, 1998

[54] FCC REGENERATOR IN PARTIAL CO BURN WITH DOWNSTREAM AIR ADDITION

[75] Inventors: Mohsen N. Harandi, Langhorne; Paul H. Schipper, Doylestown, both of Pa.; David S. Shihabi, Pennington, N.J.; Scott A. Stevenson, Langhorne, Pa.

[73] Assignee: Mobil Oil Corporation, Fairfax, Va.

[21] Appl. No.: 521,177

[22] Filed: Aug. 30, 1995

[51] Int. Cl.[6] .......................... C10G 11/00; B01J 21/20; C01B 21/02
[52] U.S. Cl. .......................... 208/113; 208/120; 502/38; 423/235; 423/239.1
[58] Field of Search .................................. 208/113, 120; 502/38; 423/235, 239.1

[56] References Cited

U.S. PATENT DOCUMENTS

| | | | |
|---|---|---|---|
| 4,290,878 | 9/1981 | Blanton, Jr. | 208/120 |
| 4,609,537 | 9/1986 | Tolpin et al. | 423/244 |
| 4,744,962 | 5/1988 | Johnson et al. | 423/235 |
| 4,755,282 | 7/1988 | Samish et al. | 208/113 |
| 5,021,144 | 6/1991 | Altrichter | 208/113 |
| 5,055,029 | 10/1991 | Avidan et al. | 431/7 |
| 5,173,278 | 12/1992 | Marler et al. | 423/239 |
| 5,268,089 | 12/1993 | Avidan et al. | 208/113 |
| 5,372,706 | 12/1994 | Buchanan et al. | 208/113 |

*Primary Examiner*—Walter D. Griffin
*Attorney, Agent, or Firm*—Thomas W. Steinberg; Malcolm D. Keen

[57] ABSTRACT

Oxides of nitrogen ($NO_x$) emissions from an FCC regenerator are reduced by operating the regenerator in partial CO burn mode to produce flue gas with more CO than $O_2$ and with $NO_x$ precursors. This flue gas is then enriched with controlled amounts of oxygen and charged over catalyst, preferably Group VIII noble metal on a support, to convert most $NO_x$ precursors to nitrogen. Flue gas may then be charged to a CO boiler. Eliminating more than 90% of $NO_x$ emissions is possible by operating the FCC regenerator in partial CO burn mode, then adding air and catalytically converting $NO_x$ precursors at substoichiometric conditions. Conversion of $NO_x$, if formed in the regenerator, may be achieved as well.

18 Claims, 2 Drawing Sheets

FCC REGENERATOR IN PARTIAL CO BURN WITH DOWNSTREAM AIR ADDITION

BACKGROUND OF THE INVENTION

1. Field of the Invention

The invention relates to regeneration of spent catalyst from an FCC unit.

2. Description of Related Art $NO_x$, or oxides of nitrogen, in flue gas streams from FCC regenerators is a pervasive problem. FCC units process heavy feeds containing nitrogen compounds, and some of this material is eventually converted into $NO_x$, emissions, either in the FCC regenerator (if operated in full CO burn mode) or in a downstream CO boiler (if operated in partial CO burn mode). Thus all FCC units processing nitrogen containing feeds can have a $NO_x$ emissions problem due to catalyst regeneration, but the type of regeneration employed (full or partial CO burn mode) determines whether NO, emissions appear sooner (regenerator flue gas) or later (CO boiler).

Although there may be some nitrogen fixation, or conversion of nitrogen in regenerator air to $NO_x$, most $NO_x$ emissions are believed to come from oxidation of nitrogen compounds in the feed.

Several powerful ways have been developed to deal with the problem. The approaches fall into roughly five categories:

1. Feed hydrotreating, to keep $NO_x$ precursors from the FCC unit.
2. Segregated cracking of fresh feed.
3. Process and hardware approaches which reduce the $NO_x$ formation in a regenerator in complete CO burn mode, via regenerator modifications.
4. Catalytic approaches, using a catalyst or additive which is compatible with the FCC reactor, which suppress $NO_x$ formation or catalyze its reduction in a regenerator in complete CO burn mode.
5. Stack gas cleanup methods which are isolated from the FCC process.

The FCC process will be briefly reviewed, followed by a review of the state of the art in reducing $NO_x$ emissions.

FCC PROCESS

Catalytic cracking of hydrocarbons is carried out in the absence of externally added $H_2$ in contrast to hydrocracking, in which $H_2$ is added during the cracking step. An inventory of particulate catalyst continuously cycles between a cracking reactor and a catalyst regenerator. In FCC, hydrocarbon feed contacts catalyst in a reactor at 425C–600C, usually 460C–560C. The hydrocarbons crack, and deposit carbonaceous hydrocarbons or coke on the catalyst. The cracked products are separated from the coked catalyst. The coked catalyst is stripped of volatiles, usually with steam, and is then regenerated. In the catalyst regenerator, the coke is burned from the catalyst with oxygen-containing gas, usually air. Coke burns off, restoring catalyst activity and heating the catalyst to, e.g., 500C–900C, usually 600C–750C. Flue gas formed by burning coke in the regenerator may be treated to remove particulates and convert carbon monoxide, after which the flue gas is normally discharged into the atmosphere.

Most FCC units now use zeolite-containing catalyst having high activity and selectivity. These catalysts are believed to work best when coke on catalyst after regeneration is relatively low.

Two types of FCC regenerators are commonly used, the high efficiency regenerator and the bubbling bed type.

The high efficiency regenerator mixes recycled regenerated catalyst with spent catalyst, burns much of the coke in a fast fluidized bed coke combustor, then discharges catalyst and flue gas up a dilute phase transport riser where additional coke combustion may occur and CO is afterburned to $CO_2$. These regenerators are designed for complete CO combustion and usually produce clean burned catalyst and flue gas with little CO and modest amounts of $NO_x$.

The bubbling bed regenerator maintains the catalyst as a bubbling fluidized bed, to which spent catalyst is added and from which regenerated catalyst is removed. These usually have more catalyst inventory in the regenerator because gas/catalyst contact is not as efficient in a bubbling bed as in a fast fluidized bed.

Many bubbling bed regenerators operate in complete CO combustion mode, i.e., the mole ratio of $CO_2/CO$ is at least 10. Many refiners burn CO completely in the catalyst regenerator to conserve heat and to minimize air pollution.

Many refiners add a CO combustion promoter metal to the catalyst or to the regenerator. U.S. Pat. No. 2,647,860 proposed adding 0.1 to 1 weight percent chromic oxide to a cracking catalyst to promote combustion of CO. U.S. Pat. No. 3,808,121, taught using relatively large-sized particles containing CO combustion-promoting metal into a regenerator. The small-sized catalyst cycled between the cracking reactor and the catalyst regenerator while the combustion-promoting particles remain in the regenerator.

U.S. Pat. Nos. 4,072,600 and 4,093,535 taught use of Pt, Pd, Ir, Rh, Os, Ru and Re in cracking catalysts in concentrations of 0.01 to 50 ppm, based on total catalyst inventory. Most FCC units now use Pt CO combustion promoter. This reduces CO emissions, but usually increases nitrogen oxides ($NO_x$) in the regenerator flue gas.

It is difficult in a catalyst regenerator to burn completely coke and CO in the regenerator without increasing the $NO_x$ content of the regenerator flue gas. Many jurisdictions restrict the amount of $NO_x$ that can be in a flue gas stream discharged to the atmosphere. In response to environmental concerns, much effort has been spent on finding ways to reduce $NO_x$ emissions.

The $NO_x$ problem is acute in bubbling dense bed regenerators, perhaps due to localized high oxygen concentrations in the large bubbles of regeneration air. Even high efficiency regenerators, with better catalyst/gas contacting, produce significant amounts of $NO_x$ though usually about 50–75% of the $NO_x$ produced in a bubbling dense bed regenerator cracking a similar feed.

Much of the discussion that follows is generic to any type of regenerator while some is specific to bubbling dense bed regenerators, which have the most severe $NO_x$ problems.

FEED HYDROTREATING

Some refiners hydrotreat feed. This is usually done to meet sulfur specifications in products or a SOx limit in regenerator flue gas, rather than a $NO_x$ limitation. Hydrotreating removes some nitrogen compounds in FCC feed, and this reduces $NO_x$ emissions from the regenerator.

SEGREGATED FEED CRACKING

U.S. Pat. No. 4,985,133, Sapre et al, incorporated by reference, taught reducing $NO_x$ emissions, and improving performance in the cracking reactor, by keeping high and low nitrogen feeds segregated, and adding them to different elevations in the FCC riser.

PROCESS AND HARDWARE APPROACHES TO $NO_x$ CONTROL

Process modifications are suggested in U.S. Pat. No. 4,413,573 and U.S. Pat. No. 4,325,833, to two-and three-stage FCC regenerators, which reduce $NO_x$ emissions.

U.S. Pat. No. 4,313,848 taught countercurrent regeneration of spent FCC catalyst, without backmixing, minimized $NO_x$ emissions.

U.S. Pat. No. 4,309,309 taught adding fuel vapor to the upper portion of an FCC regenerator to minimize $NO_x$. Oxides of nitrogen formed in the lower portion of the regenerator were reduced by burning fuel in upper portion of the regenerator.

U.S. Pat. No. 4,542,114 taught minimizing the volume of flue gas by using oxygen rather than air in the FCC regenerator. This reduced the amount of flue gas produced.

In Green et al, U.S. Pat. No. 4,828,680, incorporated by reference, $NO_x$ emissions from an FCC unit were reduced by adding sponge coke or coal to the circulating inventory of cracking catalyst. The coke absorbed metals in the feed and reduced $NO_x$ emissions. Many refiners are reluctant to add coal or coke to their FCC units, as such materials burn and increase heat release in the regenerator.

$DENO_x$ WITH COKE

U.S. Pat. No. 4,991,521 Green and Yan used coke on spent FCC catalyst to reduce $NO_x$ emissions from a two stage FCC regenerator. Flue gas from a second stage of regeneration contacted coked catalyst in a first stage. Although reducing $NO_x$ emissions this approach is not readily adaptable to existing units.

$DENO_x$ WITH REDUCING ATMOSPHERES

Another approach to reducing $NO_x$ emissions is to create a reducing atmosphere in part of the regenerator by segregating the CO combustion promoter. U.S. Pat. Nos. 4,812,430 and 4,812,431 used as CO combustion promoter Pt on a support which "floated" or segregated in the regenerator. Large, hollow, floating spheres gave a sharp segregation of CO combustion promoter in the regenerator and this helped reduce $NO_x$ emissions.

CATALYTIC APPROACHES TO $NO_x$ CONTROL

The work that follows is generally directed at catalysts which burn CO but do not promote formation of $NO_x$.

U.S. Pat. No. 4,300,997 and U.S. Pat. No. 4,350,615, use Pd—Ru CO— combustion promoter. The bimetallic CO combustion promoter is reported to do an adequate job of converting CO while minimizing $NO_x$ formation.

U.S. Pat. No. 4,199,435 suggests steaming conventional metallic CO combustion promoter to decrease $NO_x$ formation without impairing too much the CO combustion activity of the promoter.

U.S. Pat. No. 4,235,704 suggests that for an FCC regenerator operating in complete CO combustion mode too much CO combustion promoter causes $NO_x$ formation, and calls for monitoring the $NO_x$ content of the flue gases, and adjusting the concentration of CO combustion promoter in the regenerator based on the amount of $NO_x$ in the flue gas. As an alternative to adding less Pt the patentee suggests deactivating it in place by adding lead, antimony, arsenic, tin or bismuth.

U.S. Pat. No. 5,002,654, Chin, incorporated by reference, taught a zinc based additive for reducing $NO_x$. Relatively small amounts of zinc oxides impregnated on a separate support with little cracking activity produced an additive circulated with the FCC E-cat and reduced $NO_x$ emissions.

U.S. Pat. No. 4,988,432 Chin, incorporated by reference, taught an antimony based additive for reducing $NO_x$.

Many refiners are reluctant to add metals to their catalyst out of environmental concerns. Zinc may vaporize under conditions experienced in some FCC units. Antimony addition may make disposal of spent catalyst more difficult.

Such additives add to the cost of the FCC process, may dilute the E-cat and may not be as effective as desired.

In addition to these catalytic approaches, there are hybrid approaches involving catalyst and process modifications.

U.S. Pat. No. 5,021,144, Altrichter, taught operating the regenerator in partial CO burn mode with excess Pt. Adding excess Pt reduced $NO_x$ in the CO boiler stack gas. This is similar to a refiner operating in partial CO burn mode with excess Pt to ensure stable operation.

U.S. Pat. No. 5,268,089, Avidan et. al, incorporated by reference, taught reducing $NO_x$ emissions by running the FCC regenerator between full and partial CO burn mode with combustion of CO containing flue gas in a downstream CO boiler. Although a CO boiler was preferred the patent mentioned use of Pt gauze, or honeycombs coated with Pt or similar CO combustion promoter to reduce CO emissions. Avidan found this "uncomfortable" mode of regenerator operation made it possible to burn many of the $NO_x$ precursors to $N_2$ in the generally reducing atmosphere of the FCC regenerator. The flue gas from the CO boiler had less $NO_x$ than if the regenerator were run in full CO burn mode or partial CO burn mode with a CO boiler.

The '089 approach provides a good way to reduce $NO_x$ emissions, but some refiners want even greater reductions, or may be reluctant to operate their FCC regenerator in such an "uncomfortable" region which is difficult to control. Some may simply want the ability to operate their FCC regenerators solidly in the partial CO burn region, which makes the FCC unit as a whole much more flexible.

Considerable effort has also been spent on downstream treatment of FCC flue gas. This area will be reviewed next.

STACK GAS TREATMENT

First it should be mentioned that FCC regenerators present special problems. FCC regenerator flue gas will usually have large amounts, from 4 to 12 mole %, of steam, and significant amounts of sulfur compounds. The FCC environment changes constantly, and relative amounts of CO/O2 can and do change rapidly.

The FCC unit may at times make reduced nitrogen species such as ammonia, and may make oxidized nitrogen species such as $NO_x$. In some units, especially bubbling dense bed regenerators, both oxidized and reduced nitrogen contaminant compounds are present at the same time. It is as if some portions of the regenerator had a highly oxidizing atmosphere, and other had a reducing atmosphere. Many bubbling bed regenerators are believed to have reducing atmospheres, e.g., where feed is added, and oxidizing atmospheres, for catalyst particles near bubbles of regeneration air. Even if air distribution is perfectly synchronized with spent catalyst addition at the start-up of a unit, something will usually change during the course of normal operation which upset the balance of the unit. Typical upsets include changes in feed rate and composition, air distribution nozzles in the regenerator which break off, and slide valves and equipment that erode over the course of the 1–3 year run length of the FCC unit operation.

Any process used for FCC regenerator flue gas must be able to deal with the poisons and contaminants, such as sulfur compounds, which are inherent in FCC operation. The process must be robust and tolerate great changes in flue gas composition. Ideally, the process should be able to oxidize reduced nitrogen species and also have the capability to reduce oxidized nitrogen species which may be present.

Stack gas treatments have been developed which reduce $NO_x$ in flue gas by reaction with $NH_3$. $NH_3$ is a selective reducing agent which does not react rapidly with the excess oxygen which may be present in the flue gas. Two types of $NH_3$ process have evolved, thermal and catalytic.

Thermal processes, e.g. the Exxon Thermal $DeNO_x$ process, operate as homogeneous gas-phase processes at 1550°–1900° F. More details are disclosed by Lyon, R. K., Int. J. Chem. Kinet., 3, 315, 1976, incorporated by reference.

Catalytic systems have been developed which operate at lower temperatures, typically at 300°–850° F.

U.S. Pat. Nos. 4,521,389 and 4,434,147 disclose adding $NH_3$ to flue gas to reduce catalytically the $NO_x$ to nitrogen.

U.S. Pat. No. 5,015,362, Chin, incorporated by reference, taught contacting flue gas with sponge coke or coal and a catalyst promoting reduction of $NO_x$ around such carbonaceous substances.

None of the approaches described is the perfect solution.

Feed pretreatment is expensive, and usually only justified for sulfur removal. Segregated feed cracking helps but requires segregated high and low nitrogen feeds.

Multi-stage or countercurrent regenerators, reduce $NO_x$ but require extensive rebuilding of the FCC regenerator.

Various catalytic approaches, e.g., adding lead or antimony, to degrade the efficiency of the Pt function may help some but fail to meet the ever more stringent $NO_x$ emissions limits set by local governing bodies. Stack gas cleanup is powerful, but the capital and operating costs are high.

The approach disclosed in U.S. Pat. No. 5,268,089 gave a good way to reduce $NO_x$ emissions with little additional cost, but a refiner did not have as much flexibility in operating the FCC unit and this approach did not always reduce $NO_x$ to the extent desired. Of particular concern to many refiners was the difficulty of maintaining the regenerator "on the brink"—an uncomfortable operation of the FCC regenerator. While the $NO_x$ reductions were substantial, the unit was much harder to control because classical control methods no longer worked, adding more air might cool the regenerator (by dilution) or heat it up (if the regenerator was somewhat in partial combustion mode).

We wanted a better way to reduce $NO_x$ emissions associated with FCC regenerators. We liked the approach disclosed in '089, but wanted more $NO_x$ reduction and wanted to give refiners more flexibility in operating their units. We also wanted to shift at least some heat generation out of the FCC regenerator to a downstream CO boiler or the like, so that heavier feeds could be cracked in the FCC unit.

We discovered a way to operate the FCC regenerator solidly in partial CO burn mode, producing flue gas with at least 1 mole % CO, and preferably with 2 mole % CO, plus or minus 1 mole % CO, and large amounts of $NO_x$ precursors. It is also possible to operate with even smaller amounts of CO, such as 0.5 to 1.0 mole % CO, but this is only possible when there is very little, or essentially no oxygen.

We selectively convert the $NO_x$ precursors with oxygen. The oxygen source can be excess oxygen in the flue gas, added air, added oxygen and/or any oxygen containing oxidation agent. We discharge to the atmosphere a flue gas, after complete CO combustion, having less than half as much $NO_x$ as a prior art process simply using a CO boiler. By careful control of process conditions, we were able to convert more than 75% of the $NO_x$ precursors to nitrogen, with conversions of 90% or more possible with very careful control or by using multiple stage flue gas conversion downstream of the FCC regenerator.

BRIEF SUMMARY OF THE INVENTION

Accordingly the present invention provides a process for cracking a nitrogen containing hydrocarbon feed comprising cracking said feed in a cracking reactor with a source of regenerated, equilibrium cracking catalyst to produce catalytically cracked products which are removed as a product and spent catalyst containing nitrogen containing coke; regenerating spent catalyst in a regenerator by contact with a controlled amount of air or an oxygen-containing gas at regeneration conditions to produce regenerated catalyst which is recycled to said cracking reactor and regenerator flue gas; removing a regenerator flue gas stream comprising less than 1mole % oxygen, at least 0.5 mole % carbon monoxide, volatilized $NO_x$ precursors, and wherein the molar ratio of carbon monoxide to oxygen is at least 1:1; adding additional oxygen or oxygen containing gas to said regenerator flue gas stream to produce oxygen enriched flue gas; catalytically converting in a catalytic $NO_x$ precursor conversion means containing a $NO_x$ precursor conversion catalyst volatilized $NO_x$ precursors in said oxygen enriched flue gas and reducing at least 50 mole % of said $NO_x$ precursors to nitrogen.

In another embodiment, the present invention provides a fluidized catalytic cracking process for cracking a nitrogen containing hydrocarbon feed comprising cracking said feed in a fluidized catalytic cracking (FCC) reactor with a source of regenerated, equilibrium cracking catalyst to produce catalytically cracked products which are removed as a product and spent catalyst containing nitrogen containing coke; regenerating said spent catalyst in a bubbling fluidized bed catalyst regenerator by contact with a controlled amount of air or an oxygen-containing regeneration gas at regeneration conditions to produce regenerated catalyst which is recycled to said cracking reactor and regenerator flue gas; removing from said regenerator a regenerator flue gas stream comprising less than 2 mole % oxygen, at least 1 mole % carbon monoxide, and volatilized $NO_x$ precursors selected from the group of HCN and $NH_3$, and mixtures; and $NO_x$; adding additional oxygen or oxygen containing gas to said regenerator flue gas stream to produce oxygen enriched flue gas but limiting said oxygen addition so that the resulting enriched flue gas has at least a 2:1 carbon monoxide:oxygen mole ratio; catalytically converting in a catalytic $NO_x$ precursor conversion means containing a Group VIII noble metal on a support catalyst at least 50 mole % of said volatilized $NO_x$ precursors to nitrogen to produce flue gas with a reduced $NO_x$ precursor content and carbon monoxide; and adding oxygen or oxygen containing gas to said flue gas with a reduced $NO_x$ precursor content to form an oxidizing atmosphere and catalytically converting in a downstream stage of said catalytic $NO_x$ precursor at least a portion of said $NO_x$ precursors to nitrogen and oxides of nitrogen and oxidizing at least a majority of carbon monoxide present to carbon dioxide.

In another embodiment, the present invention provides a fluidized catalytic cracking process for cracking a nitrogen containing hydrocarbon feed comprising cracking said feed in a fluidized catalytic cracking (FCC) reactor with a source of regenerated, equilibrium cracking catalyst to produce catalytically cracked products which are removed as a product and spent catalyst containing nitrogen containing coke; regenerating said spent catalyst in a bubbling fluidized bed catalyst regenerator by contact with a controlled amount of air or an oxygen-containing regeneration gas at regeneration conditions including localized oxidizing and localized reducing zone to produce regenerated catalyst which is recycled to said cracking reactor and regenerator flue gas; removing from said regenerator a regenerator flue gas stream comprising less than 1 mole % oxygen, at least 1 mole % carbon monoxide, volatilized $NO_x$ precursors and $NO_x$; adding additional oxygen or oxygen containing gas to said regenerator flue gas stream to produce oxygen enriched flue gas but limiting said oxygen addition so that the resulting enriched flue gas has at least a 2:1 carbon monoxide:oxygen mole ratio; and catalytically converting said enriched flue gas in a reactor containing a Group VIII noble metal on a support at least 50 mole % of said volatilized $NO_x$ precursors to nitrogen and converting at least 25% of said $NO_x$ to nitrogen to produce treated flue gas with a reduced $NO_x$ precursor content and a reduced $NO_x$ content.

In an embodiment which involves use of non-catalytic CO conversion downstream of the FCC regenerator, the present invention provides a fluidized catalytic cracking process for cracking a nitrogen containing hydrocarbon feed comprising cracking said feed in a fluidized catalytic cracking (FCC) reactor with a source of regenerated, equilibrium cracking catalyst to produce catalytically cracked products which are removed as a product and spent catalyst containing nitrogen containing coke; regenerating said spent catalyst in a bubbling fluidized bed catalyst regenerator by contact with a controlled amount of air or an oxygen-containing regeneration gas at regeneration conditions including localized oxidizing and localized reducing zone to produce regenerated catalyst which is recycled to said cracking reactor and regenerator flue gas; removing from said regenerator a regenerator flue gas stream comprising less than 1 mole % oxygen, at least 1 mole % carbon monoxide, volatilized $NO_x$ precursors and $NO_x$; adding additional oxygen or oxygen containing gas to said regenerator flue gas stream to produce oxygen enriched flue gas but limiting said oxygen addition so that the resulting enriched flue gas has at least a 2:1 carbon monoxide:oxygen mole ratio; and catalytically converting said enriched flue gas in a reactor containing a Group VIII noble metal on a support at least 50 mole % of said volatilized $NO_x$ precursors to nitrogen and converting at least 25% of said $NO_x$ to nitrogen to produce treated flue gas with a reduced $NO_x$ precursor content and a reduced $NO_x$ content and containing CO; and adding air or oxygen containing gas to said treated flue gas and thermally converting, in a thermal CO conversion means operating at thermal CO oxidation conditions, said treated flue gas to produce a low CO and low $NO_x$ stack gas.

Other embodiments relate to preferred catalysts, such as a rhodium based catalyst.

DETAILED DESCRIPTION

Figure 1:
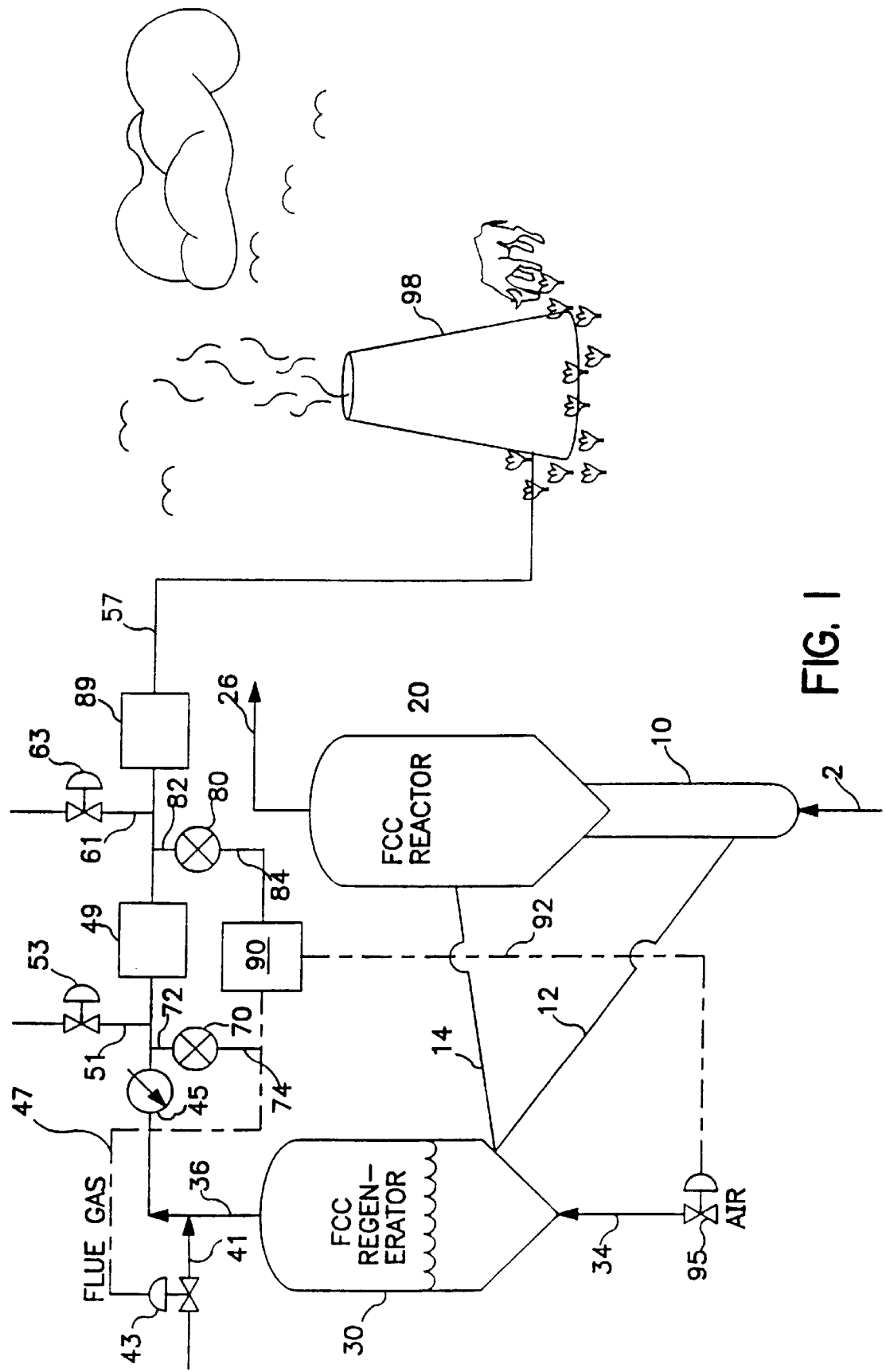
FIG. 1 shows a simplified process flow diagram of an FCC unit with a flue gas $NO_x$ precursor converter and a CO boiler.

The present invention is ideal for use with a catalytic cracking process. This process is reviewed with a review of the Figure, which is conventional up to flue gas line 36.

A heavy, nitrogen containing feed is charged via line 2 to riser reactor 10. Hot regenerated catalyst removed from the regenerator via line 12 vaporizes fresh feed in the base of the riser reactor, and cracks the feed. Cracked products and spent catalyst are discharged into vessel 20, and separated. Spent catalyst is stripped in a stripping means not shown in the base of vessel 20, then stripped catalyst is charged via line 14 to regenerator 30. Cracked products are removed from vessel 20 via line 26 and charged to an FCC main column, not shown.

Spent catalyst is maintained as a bubbling, dense phase fluidized bed in vessel 30. Regeneration gas, almost always air, sometimes enriched with oxygen, is added via line 34 to the base of the regenerator. Air flow is controlled by flow control valve 95. Regenerated catalyst is removed via line 12 and recycled to the base of the riser reactor. Flue gas is removed from the regenerator via line 36.

Much of the process and equipment recited above are those used in conventional FCC regenerators. Many FCC regenerators use such bubbling bed regenerators, which have more severe $NO_x$ emissions characteristics than high efficiency regenerators. Both types (bubbling fluid bed and fast fluid bed or high efficiency) will benefit from the practice of the present invention, which will now be reviewed.

Flue gas containing CO, HCN, $NH_3$ and the like is removed from the FCC regenerator via line 36, and may be cooled in optional cooling means 45, and charged with added air or oxygen to $NO_x$ precursor catalytic conversion zone 49 and then preferably charged to CO conversion means 89, typically a pre-existing CO boiler or a newly added catalytic converter. This permits substoichiometric combustion of the majority of the $NO_x$ precursors in the catalytic converter 49, and conversion of CO in the downstream CO converter. This is preferred for maximum conversion, but is not essential, and the downstream CO converter may be eliminated if desired. The resulting low $NO_x$ and low CO flue gas is discharged via line 57 and stack 98.

Cooling of the FCC regenerator flue gas discharged via line 36 by means not shown is preferred, but not essential.

Air, or oxygen, or oxygen enriched air or oxygen enriched inert gas addition to this flue gas line is essential, but may occur immediately downstream of the regenerator via line 41, after optional cooling and/or just upstream of or even within the $NO_x$ precursor conversion means 49. Air is preferably added via line 51 and flow control valve 53. Additional air may be added upstream of the CO conversion stage 89, if used, with air or oxygen containing gas being charged via line 61 and control valve 63.

Much conventional equipment, third stage separators to remove traces of particulates, power recovery turbines, and waste heat boilers, are omitted. There will frequently be some waste heat recovery means, not shown, downstream of the CO conversion means, and frequently there will be a power recovery turbine as well. These are preferred, but conventional.

CONTROL METHODS

The aims disclosed in U.S. Pat. No. 5,268,089 may be used herein, though the targets are somewhat different. In '089 an "on the brink" FCC regenerator operation was sought. We prefer to operate with more CO present in flue gas from the FCC regenerator.

Many ways are available to the refinery engineer to control the process. All control methods should provide for a way to have very precise control of $CO/O_2$ ratios in the substoichiometric converter 49. At no time should there be more than 125% of stoichiometric air in the inlet to converter 49, or to the inlet of the catalyst bed if the air inlet is integral with converter 49 rather than upstream of it as shown in the Figure.

The CO content may be unusually low—typically around 1 or 2 mole % CO, and the CO content may fluctuate rapidly. The control system must be both sensitive and fast responding.

As a way to put the difficult control task in perspective, most fired heaters in a refinery operate with 1 or 2 mole % oxygen in the flue gas from the heater, with essentially no CO present, typically less than 1000 ppm CO. Such a typical fired heater operates with several thousand % of stoichiometric air, while our process requires operation with less than 125% of stoichiometric air, and preferably with 80 to 100% of stoichiometric air.

In a typical FCC regenerator practicing our invention, the flue gas in line 36 will have 1 or 2 mole % CO, and usually have an order of magnitude less free oxygen. We add enough additional oxygen containing gas so that at the inlet to converter 49, the $O_2$ content is roughly ½ that of the CO content, say 0.5% oxygen for a flue gas containing 1.0 mole % CO.

If the operator allowed oxygen content to reach 0.75 mole %, selectivity of $NO_x$ precursor conversion would plummet from over 95% to less than 20%. Most of the benefit of our process would be lost, due to adding only 0.25 mole % oxygen. In many refineries it will take new oxygen sensors, and extensive operator training, to convince operators that the best way to burn $NO_x$ precursors is with not enough oxygen, and to never let the process operate with oxygen levels approaching ⅒th those in conventional flue gas streams from fired heaters and the like.

In the embodiment shown in the Figure, the CO and/or $NO_x$ content of the flue gas is preferably continuously monitored upstream and downstream of the $NO_x$ precursor converter means 49 via flue gas analyzer controllers 70 and 80, connected via taps 72 and 82 respectively. The CO content sends a signal via signal transmission means 47 to control valve 43, which regulates addition of oxygen or oxygen containing gas via line 41 to the flue gas line upstream of (or via an oxygen line directly into, by means not shown,) $NO_x$ precursor conversion means 49.

The $NO_x$ precursor converter will usually not be used as a CO boiler, and if there is too much CO in flue gas line 36 the operation of the FCC regenerator should be changed to bring the flue gas composition back into the desired range. One way to accomplish this is to use a master controller means 90 receiving signals via lines 74 and 84 of conditions in the flue gas stream upstream of and downstream of converter 49. If there is too much CO coming from the regenerator, a signal may be sent via transmission means 92 to valve 95 to admit more air to the regenerator.

Our $NO_x$ precursor conversion process tolerates very well the presence of large amounts of CO, and may be used, in part, as a CO boiler, but then some means will usually be provided for heat removal from the $NO_x$ precursor conversion means, such as a heat exchanger, not shown. The approach is the same when larger amounts of CO are present, but the heat release and temperature riser problems must be dealt with.

A similar control approach using flue gas analyzer controllers not shown may be used around the CO conversion means 89.

Although the present invention is useful for both moving bed and fluidized bed catalytic cracking units, the discussion that follows is directed to FCC units which are the state of the art.

FCC FEED

Any conventional FCC feed can be used. The process of the present invention is good for processing nitrogenous charge stocks, those having more than 500 ppm total nitrogen compounds, and especially useful in processing stocks containing high levels of nitrogen compounds, e.g., having more than 1000 wt ppm total nitrogen compounds.

The feeds may range from the typical, such as petroleum distillates or residual stocks, either virgin or partially refined, to the atypical, such as coal oils and shale oils. The feed frequently contains recycled hydrocarbons, light and heavy cycle oils which have already been subjected to cracking.

Preferred feeds are gas oils, vacuum gas oils, atmospheric resids, and vacuum resids. The invention is most useful with feeds having an initial boiling point above about 650 F.

FCC CATALYST

Commercially available FCC catalysts may be used. The catalyst preferably contains relatively large amounts of large pore zeolite for maximum effectiveness, but such catalysts are readily available. The process will work with amorphous catalyst, but few modern FCC units use amorphous catalyst.

Preferred catalysts contain at least 10 wt % large pore zeolite in a porous refractory matrix such as silica-alumina, clay, or the like. The zeolite content is preferably higher and usually will be at least 20 wt %. For best results the catalyst should contain from 30 to 60 wt % large pore zeolite.

All zeolite contents discussed herein refer to the zeolite content of the makeup catalyst, rather than the zeolite content of the equilibrium catalyst, or E-Cat. Much crystallinity is lost in the weeks and months that the catalyst spends in the harsh, steam filled environment of modern FCC regenerators, so the equilibrium catalyst will contain a much lower zeolite content by classical analytic methods. Most refiners usually refer to the zeolite content of their makeup catalyst, and the MAT (Modified Activity Test) or FAI (Fluidized Activity Index) of their equilibrium catalyst, and this specification follows this naming convention.

Conventional zeolites such as X and Y zeolites, or aluminum deficient forms of these zeolites such as dealuminized Y (DEAL Y), ultrastable Y (USY) and ultrahydrophobic Y (UHP Y) may be used as the large pore cracking catalyst. The zeolites may be stabilized with Rare Earths, e.g., 0.1 to 10 wt % RE.

Relatively high silica zeolite containing catalysts are preferred. Catalysts containing 20–60% USY or rare earth USY (REUSY) are especially preferred.

The catalyst inventory may contain one or more additives, present as separate additive particles, or mixed in with each particle of the cracking catalyst. Additives can be added to enhance octane (medium pore size zeolites, sometimes referred to as shape selective zeolites, i.e., those having a Constraint Index of 1–12, and typified by ZSM-5, and other materials having a similar crystal structure). Other additives which may be used include CO combustion promoters and SOx removal additives, each discussed at greater length hereafter.

CO COMBUSTION PROMOTER

Use of a CO combustion promoter in the regenerator is not essential for the practice of the present invention, however, some may be present. These materials are well-known.

U.S. Pat. Nos. 4,072,600 and 4,235,754, incorporated by reference, teach operating an FCC regenerator with 0.01 to 100 ppm Pt. Good results are obtained with 0.1 to 10 wt. ppm platinum on the catalyst. We usually will operate with just enough CO combustion additive to control afterburning. Conventional procedures can be used to determine if enough promoter is present. In most refineries, afterburning shows up as a 30 F., 50 F. or 75 F. temperature increase from the catalyst bed to the cyclones above the bed, so sufficient promoter may be added so no more afterburning than this occurs. Our $NO_x$ reduction process works well with large amounts of afterburning. Although we cannot prove it from the data available, afterburning may be necessary in some units to achieve large $NO_x$ reductions.

SOx ADDITIVES

Additives may be used to adsorb SOx. These are believed to be various forms of alumina, rare-earth oxides, and alkaline earth oxides, containing minor amounts of Pt, on the order of 0.1 to 2 ppm Pt. Additives are available from several catalyst suppliers, such as Davison's "R" or Katalistiks International, Inc.'s "DESOX."

Our invention permits efficient use of these additives even though the regenerator is not in complete CO burn mode. When a regenerator is in complete CO burn mode, SOx capture additives recover 60 to 70% of the SOx, while in conventional partial CO burn mode SOx capture drops to 30% or so. In our process SOx additives can still capture more than 40%, and preferably more than 50% of the SOx while $NO_x$ emissions are drastically reduced.

The FCC catalyst composition, per se, forms no part of the present invention.

FCC REACTOR CONDITIONS

The reactor operation will usually be conventional all riser cracking FCC, such as disclosed in U.S. Pat. No. 4,421,636, incorporated by reference. Typical riser cracking reaction conditions include catalyst/oil ratios of 0.5:1 to 15:1 and preferably 3:1 to 8:1, and a catalyst contact time of 0.1–50 seconds, and preferably 0.5 to 10 seconds, and most preferably about 0.75 to 5 seconds, and riser top temperatures of 900 to about 1100, preferably 950 to 1050 F.

It is important to have good mixing of feed with catalyst in the base of the riser reactor, using conventional techniques such as adding large amounts of atomizing steam, use of multiple nozzles, use of atomizing nozzles and similar technology. The Atomax nozzle, available from the M. W. Kellogg CO, is preferred. Details about an excellent nozzle are disclosed in U.S. Pat. Nos. 5,289,976 and 5,306,418 which are incorporated by reference.

It is preferred, but not essential, to have a riser catalyst acceleration zone in the base of the riser.

It is preferred, but not essential, for the riser reactor to discharge into a closed cyclone system for rapid separation of cracked products from spent catalyst. A closed cyclone system is disclosed in U.S. Pat. No. 4,502,947 to Haddad et al, incorporated by reference.

It is preferred but not essential, to strip rapidly the catalyst as it exits the riser and upstream of the catalyst stripper. Stripper cyclones disclosed in U.S. Pat. No. 4,173,527, Schatz and Heffley, incorporated by reference, may be used.

It is preferred, but not essential, to use a hot catalyst stripper. Hot strippers heat spent catalyst by adding hot, regenerated catalyst to spent catalyst. A hot stripper is shown in U.S. Pat. No. 3,821,103, Owen et al, incorporated by reference. After hot stripping, a catalyst cooler may cool heated catalyst before it is sent to the regenerator. A preferred hot stripper and catalyst cooler is shown in U.S. Pat. No. 4,820,404, Owen, incorporated by reference.

Conventional FCC steam stripping conditions can be used, with the spent catalyst having essentially the same temperature as the riser outlet, and with 0.5 to 5% stripping gas, preferably steam, added to strip spent catalyst.

The FCC reactor and stripper conditions, per se, can be conventional.

CATALYST REGENERATION

The process and apparatus of the present invention can be used with bubbling dense bed FCC regenerators or high efficiency regenerators. Bubbling bed regenerators will be considered first.

BUBBLING BED CATALYST REGENERATORS

In these regenerators much of the regeneration gas, usually air, passes through the bed in the form of bubbles. These pass through the bed, but contact it poorly.

These units operate with large amounts of catalyst. The bubbling bed regenerators are not very efficient at burning coke so a large catalyst inventory and long residence time in the regenerator are needed to produce clean burned catalyst.

The carbon levels on regenerated catalyst can be conventional, typically less than 0.3 wt % coke, preferably less than 0.15 wt % coke, and most preferably even less. By coke we mean not only carbon, but minor amounts of hydrogen associated with the coke, and perhaps even very minor amounts of unstripped heavy hydrocarbons which remain on catalyst. Expressed as wt % carbon, the numbers are essentially the same, but 5 to 10% less.

Although the carbon on regenerated catalyst can be the same as that produced by conventional FCC regenerators, the flue gas composition may range from conventional partial CO burn with large amounts of CO to flue gas with significant amounts of both CO and oxidized nitrogen species. Thus operation may range from deep in partial CO burn to something which is still partial CO burn in that there is more than 1% CO present but contains some $NO_x$ as well. There should always be enough CO present in the flue gas so that the FCC regenerator may be reliably controlled using control techniques associated with partial CO combustion, e.g, use of afterburning in the regenerator to control regenerator air rate.

Strictly speaking, the CO content could be disregarded if sufficient resources are devoted to analyzing the $NO_x$ precursors directly, e.g., HCN. It would also be possible to run oxygen and carbon balances, and develop some sort of feed forward model which might be used to calculate some property of flue gas or of regenerator operation which would yield the same information in terms of controlling the unit as measuring the CO content of the regenerator flue gas. In most refineries this is neither practical nor necessary as the CO content of the flue gas is a sensitive indicator of the $NO_x$ precursors generated by a particular regenerator processing a particular feed.

The CO content of flue gas should be considered with the oxygen content of the flue gas. There must be at least as much CO, by volume or molar amount, as oxygen. Preferably the $CO/O_2$ ratio is above 2:1, and more preferably at least 3:1, 4:1, 5:1, 10:1 or higher.

The lower limit on CO content may be as low as 0.1 mole % or 0.5%, but only when the oxygen content is less than 50% of the CO content, and most regenerators in partial CO burn mode can not produce such low CO content flue gas. Poor air distribution, or poor catalyst circulation in the regenerator, and presence of large air bubbles in the dense bed will require most refiners to operate with at least 1 mole % CO, and preferable with 2 to 6 mole % CO.

The regenerator flue gas may contain significant amounts of oxygen but does not have to. If oxygen is present, it should be present in substoichiometric amounts. Our process allows bubbling bed regenerators to make excellent use of regeneration air. It is possible to operate the FCC regenerator with essentially no waste of combustion air.

Temperatures in our regenerator can be similar to conventional regenerators in complete CO combustion mode. Much of the coke on catalyst may be burned to form $CO_2$ rather than CO. Temperatures can also be cooler than in a conventional regenerator, as the regenerator operation shifts deeper into partial CO burn mode.

Catalyst coolers, or some other means for heat removal from the regenerator, can be used to cool the regenerator. Addition of torch oil or other fuel can be used to heat the regenerator.

We prefer to keep regenerator temperatures low, to make such afterburning as may occur less troublesome and to limit downstream temperature rise. We prefer to operate with temperatures below 1300 F., and preferably below 1250 F., but many units will be run above 1300 F., e.g., from 1330 to 1400 F.

FAST FLUIDIZED BED REGENERATORS

Our process may also be used with high efficiency regenerators (H.E.R.), with a fast fluidized bed coke combustor, dilute phase transport riser, and second bed to collect regenerated catalyst. It will be necessary to operate these in partial CO burn mode to make CO specifications.

H.E.R.'s inherently make excellent use of regeneration air. Most operate with 1 or 2 mole % O2 or more in the flue gas when in complete CO burn mode. When in partial CO burn mode most operate with little excess oxygen, usually in the ppm range, always less than 1/10th %. For HER's, significant reductions in the amount of air added may be necessary to produce a flue gas with the correct CO/O2 ratio. Reducing or eliminating CO combustion promoter may be necessary to generate a flue gas with twice as much CO as oxygen.

Although most regenerators are controlled primarily by adjusting the amount of regeneration air added, other equivalent control schemes are available which keep the air constant and change some other condition. Constant air rate, with changes in feed rate changing the coke yield, is an acceptable way to modify regenerator operation. Constant air, with variable feed preheat, or variable regenerator air preheat, are also acceptable. Finally, catalyst coolers can be used to remove heat from a unit. If a unit is not generating enough coke to stay in heat balance, torch oil, or some other fuel may be burned in the regenerator.

Up to this point in the FCC process, through the regenerator flue gas, the operation can be within the limits of conventional operation. In many instances the refiner will choose to operate the regenerator solidly in partial CO burn mode, which is highly conventional. Other refiners will operate with much lower amounts of CO in the regenerator flue gas, but always controlling regenerator operation so that the CO content is at least twice that of the oxygen content, molar basis.

This type of regenerator operation lays a proper foundation for the catalytic, post-regenerator conversion of $NO_x$ precursors, discussed hereafter.

CATALYTIC POST-REGENERATOR, $NO_x$ PRECURSOR CONVERSION

While there are many variations, discussed below, the unifying theme of the present invention is formation of $NO_x$ precursors in the regenerator coupled with selective conversion of $NO_x$ precursors downstream of the FCC regenerator. The catalytic conversion step is upstream of, and in some embodiments can be a substitute for, a CO boiler. Following catalytic conversion of $NO_x$ precursors, and conversion of CO, a flue gas stream with a greatly reduced $NO_x$ content may be sent to a stack which discharges to the atmosphere. All embodiments of the present invention involve injecting air, or oxygen containing gas into CO and $NO_x$ precursor containing flue gas downstream of the FCC regenerator and upstream of a catalytic $NO_x$ precursor conversion zone.

Two types of catalytic $NO_x$ precursor conversion have been developed, selective and non-selective. Selective conversion uses a $NO_x$ precursor selective conversion catalyst and permits great latitude in operating conditions. The non-selective catalyst permits many catalysts to be used, but requires more careful control of the environment around the catalyst.

$NO_x$ PRECURSOR SELECTIVE CATALYSTS

Some catalysts selectively convert $NO_x$ precursors at the conditions found in FCC regenerator flue gas streams. An example is $Na_2O_3/SiO_2$. This catalyst can oxidize most HCN in a typical FCC regenerator flue gas stream while oxidizing less than 10% of the CO present. The process is extremely simple, enough air or oxygen containing gas is added to the regenerator flue gas stream to oxidize the desired amount of reduced nitrogen species. Typically 100 to 200% the air required by stoichiometry for combustion of the $NO_x$ precursors present should be added, but more air may be safely added. The $NO_x$ precursors comprise an extremely small part of the volume of the FCC regenerator flue gas, and an upper limit on oxygen addition would be that where an undesired amount of CO combustion occurs, either catalytically or thermally.

Selective catalytic conversion of $NO_x$ precursors permits the FCC regenerator to operate deep in partial CO burn mode with significant heat release shifted from the regenerator to a downstream CO boiler.

No vendor sells selective catalysts. Availability, experience and stability will be a concern to many refiners. Until selective catalysts are commercially available, many refiners will prefer to use proven conventional oxidation catalysts, which are not so selective, and adjust operating conditions to favor conversion of $NO_x$ precursors, as discussed hereafter.

CATALYTIC CONVERSION AT SUBSTOICHIOMETRIC CONDITIONS

We discovered that conventional oxidation catalysts, such as Pt or Rh on an amorphous support, can selectively convert HCN and $NH_3$ to nitrogen even in the presence of CO provided the operating conditions are properly maintained. Careful selection of operating conditions, and gas feed, allows catalysts as simple as Pt on an amorphous support to convert most of the $NO_x$ precursors in a gas stream containing CO without converting most CO present.

The presence of both CO and oxygen is essential, in addition to the HCN, $NH_3$ or other reduced nitrogen species which will also be present. It is important that there be more CO than oxygen, on a molar basis. Preferably the mole ratio $CO:O_2$ is 2:1 or higher.

The temperature may range from 300° to 800° C., preferably 400° to 700° C. Temperatures near the higher ends of these ranges generally give higher conversions.

The catalyst may be disposed as a fixed, fluidized, or moving bed. To simplify design, and reduce pressure drop, it may be beneficial to dispose the catalyst as a plurality of honeycomb monoliths, or as a radial flow fixed bed, or as a bubbling fluidized bed.

Gas hourly space velocities, GHSV's, may vary greatly. There is no lower limit on GHSV other than that set by economics or space constraints. These reactions proceed quickly, very high space velocity operation is possible, especially with fresh catalyst and/or operation in the higher end of the temperature range.

Most refiners will operate with GHSV's above 1000, typically with GHSV's from 2000 to 250,000 $hr^{-1}$, preferably from 2500 to 125,000 $hr^{-1}$, and most preferably from 25000 to 50,000 $hr^{-1}$.

Large amounts of water vapor may be tolerated. We have tested this chemistry with several different catalysts and found several that tolerate up to 9 mole % $H_2O$ vapor while achieving selective $NO_x$ precursor conversion, although conversion was lowered to some extent as water content increased.

Our process was tested on flue gas with 500 ppm $NH_3$ or HCN. We are confident that the process will treat gas streams containing more $NO_x$ precursors, but FCC regenerators usually have less than 500 ppm of either $NH_3$ or HCN.

It is beneficial to limit conversion in the $NO_x$ precursor conversion means so that some of the CO survives. If all CO is converted, there will be, in some places in the $NO_x$ precursor conversion zone, some places with no CO, or where oxygen exceeds CO, molar basis. When this occurs, $NO_x$ precursors can still be converted, but form both $NO_x$ and nitrogen. Another alternative is that $NO_x$ precursors are converted into $NO_x$ and reduced by reaction with CO, in some as yet not completely understood reaction mechanism.

Complete CO conversion is therefore not desirable in the $NO_x$ precursor conversion means. Complete CO conversion is also not necessary, as the process preferably retains a more or less conventional CO boiler, or equivalent, downstream of the $NO_x$ precursor conversion reactor, discussed next.

CO CONVERSION MEANS

Basically any of the devices disclosed in U.S. Pat. No. 5,268,089 may be used. Many refiners have conventional CO boilers in place, but some may prefer to use a catalytic converter, such as Pt on alumina on a monolith support, similar to the honeycomb elements used to burn CO and resin from flue gas produced in wood stoves.

The CO conversion means can operate conventionally, typically with enough excess oxygen to provide 1–2 mole % oxygen in the flue gas from the CO conversion means.

CO, $NO_x$ EMISSIONS AFTER CO COMBUSTION

Regardless of the intermediate steps, the flue gas going up the stack will have unusually low levels of both $NO_x$ and CO. The $NO_x$ and CO levels should be below 100 ppm. Preferably the $NO_x$ and CO levels are each below 50 ppm.

EXAMPLE 1
Pt on Alumina Catalyst

The catalyst was prepared by the incipient wetness impregnation of $H_2PtCl_6$ onto commercial gamma-alumina, followed by air calcination at 535° C. for two hours. The chloride concentration of the catalyst was approximately 0.73%. Chemisorption studies found H/Pt and O/Pt ratios of 1.25 and 0.62, respectively, indicating that the platinum was highly dispersed. The catalyst contained approximately 1.05% Pt on $Al_2O_3$.

EXAMPLE 2
Tests w/Pt Catalyst 0.25 g of catalyst, which was in the form of ⅛" beads, was loaded into a ⅜" OD quartz tube and fixed between plugs of quartz wool. The total amount of Pt in the reactor was approximately 2.6 mg. The catalyst bed temperature was varied between 400° and 600° C. A gas stream containing CO, $O_2$, and HCN or $NH_3$ was passed over this catalyst at a rate of 400 $cm^3$/min, giving a total space velocity of approximately 50,000 $hr^{-1}$. The concentrations of CO, $CO_2$, $H_2O$, HCN, $NH_3$, NO, $NO_2$ and $N_2O$ in the exit gas were determined using FTIR; the concentration of $N_2$ was estimated by mass balance.

Two additional experiments were performed to test the resistance of the catalyst to $SO_2$ poisoning and to high temperature treatment. Because of the potential for damage to the FTIR cell, $SO_2$ treatments were effected by passing a gas stream containing 300 ppm $SO_2$ in balance argon over the catalyst for one hour at 600° C.; the reactor was then flushed for one hour at 400° C. in pure Ar before measurements were continued. In the high temperature test, catalyst activity was measured before and after the catalyst was exposed to 2% CO and 1% $O_2$ at 850° C. for one hour.

RESULTS AND DISCUSSION

Table 1 shows the conversion of 2% CO and 200 ppm $NH_3$ with 1% $O_2$ as a function of reaction temperature. Conversion of CO is essentially constant at 95%. Ammonia conversion increases with increasing temperature; conversion exceeds 95% for temperatures of 450° C. and above. Selectivity of ammonia conversion to molecular nitrogen is 100% at all temperatures studied. Table 1 indicates that raising the space velocity by increasing the total gas flow rate had little effect on conversion or selectivity. CO and $NH_3$ conversion appear to be limited by the amount of oxygen fed and not by the amount of catalyst, suggesting that the process could be run at significantly higher space velocities.

Figure 2:
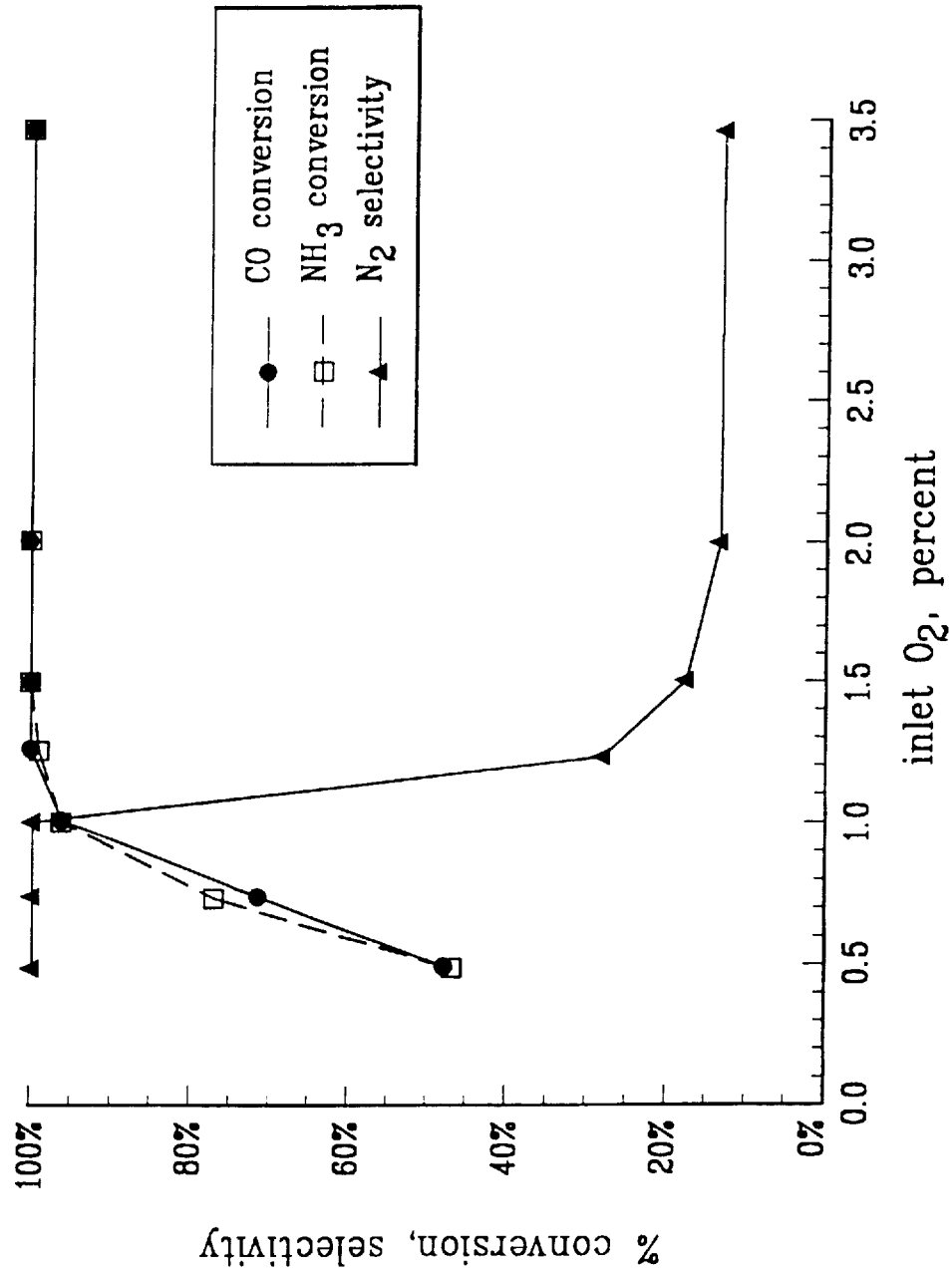
FIG. 2 is a graphical presentation of actual tests of catalytic conversion of a gas stream containing CO, $NH_3$ and varying amounts of oxygen.

The effect of $CO/O_2$ ratio is shown in Table 2 and FIG. 2, which show data collected at 500° C. with 2% CO, 200 ppm $NH_3$ and 0.5 to 3.5% $O_2$. CO and $NH_3$ conversion increase in parallel as the inlet oxygen concentration is increased, but selectivity to $N_2$ drops quickly once the stoichiometric amount of oxygen is exceeded. Significant amounts of NO and $NO_2$ are formed when the inlet $CO/O_2$ ratio falls below two. Similar data are shown in Table 3 for the conversion of 100 ppm HCN. As long as the $CO/O_2$ ratio is greater than or equal to two, HCN is converted exclusively to molecular nitrogen. When more than stoichiometric oxygen is present, little $N_2$ is formed and the products are primarily NO and $NO_2$. A comparison of Tables 2 and 3 shows that, under the same conditions, HCN is converted more rapidly than ammonia, although selectivity to $N_2$ follows the same pattern.

If the $CO/O_2$ ratio is near two, the catalyst can convert large amounts of ammonia without a loss in selectivity, as shown by the date in Table 4, where the inlet ammonia concentration was varied from 66 to 468 ppm. Both $NH_3$ and CO conversion fall slightly as the inlet ammonia concentration is increased. This is most plausibly ascribed to the increasing amount of oxygen needed for a given conversion; the combustion of the hydrogen in 468 ppm ammonia to water requires approximately 0.035% $O_2$, decreasing the amount of oxygen available for CO oxidation. For all inlet ammonia concentrations, however, the selectivity of ammonia conversion to molecular nitrogen remained 100%.

FCC regenerators, especially bubbling dense bed regenerators, may under certain circumstances form NO as well as HCN and $NH_3$, we also determined the conversion of NO in the presence of CO, $NH_3$, and $O_2$ over the $Pt/Al_2O_3$ catalyst; these data are shown in Table 5. As long as significant amounts of $NH_3$ were present, NO was converted to $N_2$ with 100% selectivity; in the absence of ammonia, NO conversion fell to 92%. This suggests that if a unit operating in partial CO combustion mode forms some NO, it will be converted to $N_2$ along with the $NH_3$ and HCN. Of course this conversion will occur only so long as the unit is in partial CO combustion mode, since operation in full CO combustion mode will preclude the presence of percent levels of CO. From other studies we expect the concentration of $NH_3$ and HCN will always be greater than the NO concentration for a unit operating in partial CO combustion mode.

In order to determine the resistance of the catalyst to $SO_2$, we treated a sample for one hour at 600° C. in a gas stream containing 300 ppm $SO_2$, as described above. The effect of this treatment on catalyst activity and selectivity, as shown in Table 6, was negligible. These data suggest that $SO_2$ does not have a strong inhibiting effect on either the activity or selectivity of this catalyst.

Finally, in order to study the effect of temperature excursions on catalyst stability, we treated a catalyst sample for 30 minutes at 850° C. in 2% CO and 1% $O_2$. As can be seen in Table 7, this treatment has little or no effect on the catalyst activity or selectivity. This experiment suggests that short excursions to temperatures as high as 850° C. can be tolerated. In practice, the maximum temperature can be limited by limiting the amount of air that is supplied to the catalyst.

REACTION MECHANISMS

Considering these results, it is interesting to speculate on the mechanism of the conversion of $NH_3$ to $N_2$. Three possibilities might be suggested: (1) adsorption and dissociation of $NH_3$ followed by direct combination of surface nitrogen atoms, (2) oxidation of $NH_3$ to NO followed by reduction of NO by CO, and (3) oxidation of some of the $NH_3$ to NO followed by reduction of NO by $NH_3$. Although Pt is known to catalyze the reduction of NO by $NH_3$, that is unlikely as HCN is converted at an even more rapid rate than $NH_3$ and because the selectivity to $N_2$ was extremely high at all temperatures, a result which requires that the reduction of NO be much faster than its formation. Pt is also known to catalyze the reduction of CO by NO; however, most research suggests that this reduction is not direct but involves the adsorption and dissociation of NO followed by the combination of surface nitrogen atoms to form $N_2$ and removal of the oxygen from the platinum surface by reaction with CO. In this case, the reduction of No by CO and the conversion of $NH_3$ to $N_2$ would proceed by essentially the same route, dissociation followed by reaction of two surface nitrogen atoms.

Given these considerations, it seems likely that the role of CO is to maintain the platinum in a reduced state so that it can rapidly dissociate $NH_3$ without forming NO. This is consistent with the observation that selectivity to $N_2$ falls dramatically when a small amount of excess oxygen is present. If No was an intermediate for $N_2$ formation and the role of CO was to reduce the NO, it seems unlikely that such a small increase in oxygen would have such a large effect on the $N_2$ selectivity, since the rates of CO and $NH_3$ conversion are not greatly different (see FIG. 1.) If, however, the role of CO is to keep the Pt in a reduced state, even a small amount of excess oxygen would convert the active metal from platinum to platinum oxide, changing the selectivity of the catalyst.

TABLE 1

Conversion of CO and $NH_3$ as a function of temperature.
Inlet conditions: 2% CO, 1% $O_2$, 200 ppm $NH_3$

| T (°C.) | Space velocity ($hr^{-1}$) | % CO Conversion | % $NH_3$ Conversion | % $N_2$ Selectivity |
|---|---|---|---|---|
| 400 | 50,000 | 95 | 89 | 100 |
| 450 | 50,000 | 96 | 96 | 100 |
| 500 | 50,000 | 95 | 99 | 100 |
| 500 | 75,000 | 95 | 98 | 100 |
| 500 | 100,000 | 95 | 98 | 100 |
| 550 | 50,000 | 95 | 99 | 100 |
| 600 | 50,000 | 95 | 100 | 100 |

TABLE 2

Conversion of CO and $NH_3$ as a function of inlet $O_2$ concentration.
Conditions: T = 500° C., 2% CO, 200 ppm $NH_3$ fed

| inlet $O_2$ (%) | % CO Conversion | % $NH_3$ Conversion | % $N_2$ Selectivity |
|---|---|---|---|
| 0.50 | 47 | 46 | 100 |
| 0.75 | 71 | 77 | 100 |
| 1.01 | 96 | 96 | 100 |
| 1.26 | 100 | 99 | 29 |
| 1.51 | 100 | 100 | 18 |
| 2.01 | 100 | 100 | 14 |
| 3.48 | 100 | 100 | 14 |

TABLE 3

Conversion of CO and HCN as a function of inlet $O_2$ concentration.
Conditions: T = 500° C., 2% CO, 100 ppm HCN fed

| inlet $O_2$ (%) | % CO Conversion | % HCN Conversion | % $N_2$ Selectivity |
|---|---|---|---|
| 0.75 | 69 | 94 | 100 |
| 1.01 | 96 | 98 | 100 |
| 1.51 | 98 | 99 | 12 |

TABLE 4

Effect of inlet $NH_3$ concentration on conversion.
Conditions: T = 500° C., 2% CO, 1% $O_2$ fed

| inlet $NH_3$ (ppm) | % CO Conversion | % $NH_3$ Conversion | % $N_2$ Selectivity |
|---|---|---|---|
| 66 | 96 | 100 | 100 |
| 100 | 97 | 100 | 100 |
| 200 | 96 | 100 | 100 |
| 300 | 95 | 98 | 100 |
| 400 | 94 | 97 | 100 |
| 468 | 94 | 96 | 100 |

TABLE 5

Effect on NO addition.
Conditions: T = 500° C., 2% CO, 1% $O_2$, 200 ppm $NH_3$ fed

| inlet $NH_3$ (ppm) | inlet NO (ppm) | % CO Conversion | % $NH_3$ Conversion | % $N_2$ Selectivity |
|---|---|---|---|---|
| 590 | 0 | 93 | 95 | 100 |
| 480 | 79 | 95 | 96 | 100 |
| 404 | 134 | 95 | 96 | 100 |
| 305 | 205 | 96 | 97 | 100 |
| 207 | 276 | 97 | 97 | 100 |
| 0 | 424 | 100 | — | 92 |

TABLE 6

Effect of $SO_2$ treatment on conversion.
Catalyst treated for one hour at 600° C. in 300 ppm $SO_2$
Conditions: T = 500 C., 2% CO, 1% $O_2$, 200 ppm $NH_3$

| | % CO conversion | | % $NH_3$ conversion | | % $N_2$ selectivity | |
|---|---|---|---|---|---|---|
| T (°C.) | before | after $SO_2$ | before | after $SO_2$ | before | after $SO_2$ |
| 450 | 96 | 95 | 96 | 98 | 100 | 100 |
| 500 | 95 | 95 | 99 | 99 | 100 | 100 |
| 550 | 95 | 95 | 99 | 99 | 100 | 100 |
| 600 | 95 | 95 | 100 | 99 | 100 | 100 |

TABLE 7

High temperature treatment does not deactivate Pt catalyst.
Conditions: T = 500° C., 2% CO, 1% $O_2$, 200 ppm $NH_3$
Catalyst treated 30 minutes at 850° C. in 2% CO, 1% $O_2$

| | % CO conversion | % $NH_3$ conversion | % $N_2$ selectivity |
|---|---|---|---|
| before treatment | 95 | 99 | 100 |
| after treatment | 96 | 98 | 100 |

EXAMPLE 3
Rh/Al2O3 Catalyst

We obtained from Strem Chemicals a catalyst with about 0.50% Rh on $Al_2O_3$. 0.25 g of catalyst was loaded into a ⅜" OD quartz tube and fixed between plugs of quartz wool. The total amount of Rh in the reactor was approximately 1.25 mg, approximately half the 2.6 mg Pt used in our earlier studies.

EXAMPLE 4
Tests w/Rh Catalyst

The catalyst bed temperature was varied between 450° and 650° C. A gas stream containing 2% CO, 0.5 to 1.5% $O_2$, zero to 9% $H_2O$, and 125 HCN or 200 ppm $NH_3$ was passed over this catalyst at a rate of 400 cm$^3$/min, giving a total space velocity of approximately 55,000 hr$^{-1}$. The concentrations of CO, $CO_2$, $H_2O$, HCN, $NH_3$, NO, $NO_2$ and $N_2O$ in the exit gas were determined using FTIR; the nitrogen concentration was estimated by mass balance.

RESULTS AND DISCUSSION

Table 8 shows the conversion of 2% CO and 200 ppm $NH_3$ with 1% $O_2$ as a function of reaction temperature from 450° to 650° C. Conversion of CO is essentially constant at 95 to 96%. Ammonia conversion is 100% at all temperatures studied, as is the selectivity to molecular nitrogen. These results compare favorably with those obtained using the 1% Pt/$Al_2O_3$ catalyst, where $NH_3$ conversions were somewhat lower even though the noble metal concentration was twice as high.

The effect of CO/$O_2$ ratio is shown in Table 9, which shows data collected at 500° C. with 2% CO, 200 ppm $NH_3$ and 0.5 to 1.5% $O_2$. CO and $NH_3$ conversion both increase as the inlet oxygen concentration is increased, but selectivity to $N_2$ drops once the stoichiometric amount of oxygen is exceeded. When a substoichiometric amount of oxygen is fed, the rhodium catalyst converts ammonia at a faster rate than CO. Table 9 shows that 97% of the $NH_3$ but only 44% of the CO was converted when 2% CO and 0.5% $O_2$ were fed. In contrast, under the same conditions the platinum catalyst converted 47% of the CO and only 46% of the $NH_3$. Consistent with our earlier findings, considerable amounts of NO and $NO_2$ are formed when the inlet CO/$O_2$ ratio falls below two. Significantly, however, the Rh/$Al_2O_3$ catalyst still converts 64% of the $NH_3$ to $N_2$ when 1% CO and 1.5% $O_2$ are fed; under these conditions the Pt/$Al_2O_3$ catalyst converted only 18% of the $NH_3$ to $N_2$.

Tables 10 and 11 show the effect of the addition of up to 9% water on the conversion of $NH_3$ to $N_2$ at 500° and 600° C. with a stoichiometric ratio of CO and $O_2$. At both temperatures the CO conversion increases slightly as the water concentration increases; a similar result was observed from the Pt/$Al_2O_3$ catalyst and is most likely due to the water-gas shift reaction. Ammonia conversions over the rhodium catalyst is 99% or greater at all conditions studied. In comparison, ammonia conversion over the platinum catalyst in the presence of 9% water fell to 82 and 91% at 500° and 600° C., respectively. Although conversions are too high to make accurate rate comparisons, these data suggest that the rhodium catalyst is at least two to three times more active than the platinum catalyst on a per-volume basis; since the Pt concentration was twice that of the Rh concentration, the total activity per unit weight of noble metal appears to be four to six times greater in the case of the Rh catalyst. It is not clear if this greater activity is due entirely to a higher intrinsic rate of ammonia conversion, or if the Rh catalyst is also more resistant to site blocking by water.

Table 12 shows the conversion of 125 ppm HCN in the presence of 2% CO, 1% $O_2$, and zero to nine percent $H_2O$. As with ammonia, HCN is essentially completely converted to molecular nitrogen even when nine percent water is present.

TABLE 8

Conversion of CO and $NH_3$ as a function of temperature over Rh/Alumina catalyst
Inlet conditions: 2% CO, 1% $O_2$, 200 ppm $NH_3$.
Space velocity = 55,000 hr$^{-1}$.

| T (°C.) | % CO conversion | % $NH_3$ conversion | % $N_2$ selectivity |
|---|---|---|---|
| 450 | 96 | 100 | 100 |
| 500 | 96 | 100 | 100 |
| 550 | 96 | 100 | 100 |
| 600 | 95 | 100 | 100 |
| 650 | 95 | 100 | 100 |

TABLE 9

Conversion of CO and NH$_3$ as a function of inlet O$_2$ concentration over Rh/Alumina catalyst Conditions: T = 500° C., 2% CO, 200 ppm NH$_3$ fed.

| inlet O$_2$ (%) | % CO conversion | % NH$_3$ conversion | % N$_2$ selectivity |
|---|---|---|---|
| 0.50 | 44 | 97 | 100 |
| 0.75 | 70 | 99 | 100 |
| 1.01 | 94 | 100 | 100 |
| 1.51 | 94 | 100 | 64 |

TABLE 10

Conversion of CO and NH$_3$ in the presence of H$_2$O over Rh/Alumina catalyst.
Conditions: T = 500° C., 2% CO, 1% O$_2$, 200 ppm NH$_3$ fed.

| Inlet H$_2$O (%) | % CO conversion | % NH$_3$ conversion | % N$_2$ selectivity |
|---|---|---|---|
| 0 | 95 | 100 | 100 |
| 1 | 98 | 100 | 100 |
| 3 | 100 | 100 | 100 |
| 6 | 100 | 100 | 100 |
| 9 | 100 | 99 | 100 |
| 0 | 96 | 100 | 100 |

TABLE 11

Conversion of CO and NH$_3$ in the presence of H$_2$O over Rh/Alumina catalyst.
Conditions: T = 600° C., 2% CO, 1% O$_2$, 200 ppm NH$_3$ fed.

| Inlet H$_2$O (%) | % CO conversion | % NH$_3$ conversion | % N$_2$ selectivity |
|---|---|---|---|
| 0 | 96 | 100 | 100 |
| 1 | 97 | 100 | 100 |
| 3 | 99 | 100 | 100 |
| 6 | 100 | 100 | 100 |
| 9 | 100 | 100 | 100 |
| 0 | 96 | 100 | 100 |

TABLE 12

Conversion of CO and HCN in the presence of H$_2$O.
Conditions: T = 500° C., 2% CO, 1% O$_2$, 125 ppm HCN fed.

| Inlet H$_2$O (%) | % CO conversion | % NH$_3$ conversion | % N$_2$ selectivity |
|---|---|---|---|
| 0 | 95 | 100 | 100 |
| 1 | 98 | 100 | 100 |
| 3 | 98 | 100 | 100 |
| 6 | 98 | 100 | 100 |
| 9 | 99 | 98 | 100 |
| 6 | 99 | 99 | 100 |
| 0 | 96 | 100 | 100 |

Although in our tests rhodium is more active for the conversion of HCN and NH$_3$ to N$_2$ than platinum, it does not necessarily follow that rhodium will be a better choice commercially. Rhodium is now somewhat more expensive than platinum per troy ounce. Additionally, we do not have catalyst lifetime data for either metal, so it is unknown which will last longer in service.

DISCUSSION

The process of the present invention can be readily used in existing bubbling bed or fast fluidized bed FCC regenerators with only minor hardware changes. Operation will be facilitated if the regenerator is equipped with sophisticated controls, permitting control to be based at least in part on one or more flue gas compositions, such as NO$_x$, CO, or free oxygen.

The process may also be used to efficiently convert flue gas streams containing NO$_x$ precursors and carbon monoxide.

An especially powerful implementation of the process of the present invention will be a multi-bed NO$_x$ pre-cursor conversion process, with the first bed operating in a reducing environment (substoichiometric oxygen), and subsequent beds operating with an oxidizing environment. The first bed will achieve 50 to 90% conversion of NO, precursors, but only 10 to 70% conversion of CO. Because of the reducing conditions, such conversion of NO$_x$ precursors as occurs will be extremely selective, on the order of 95+%, and typically 99+% selective. The downstream bed can operate at more robust conditions, as great selectivity is no longer necessary, with the elimination of most NO$_x$ precursors upstream of this oxidizing portion of the bed.

It will also be feasible in many instances to use the two stage approach, and use a conventional CO boiler for CO conversion, rather than a catalyst. Thus the CO boiler can be used to convert the last amounts of NO$_x$ precursors and CO into more oxidized species. The CO boiler will not be selective, but so long as the gross amount of NO$_x$ precursors fed to the CO boiler is sufficiently reduced the net effect of the process will be reduction in NO$_x$ emissions in the stack.

A single bed may, with staged air injection, simulate two separate reactors. A minority, less than 50 mole %, of the total air could be mixed with the feed gas to the inlet of the bed. A sparger or other air distribution means in a lower or downstream portion of the bed may be used for the remainder of the air injection to create an oxidizing atmosphere in that downstream portion.

We claim:

1. A catalytic cracking process for cracking a nitrogen containing hydrocarbon feed comprising:
    a. cracking said feed in a cracking reactor with a source of regenerated, equilibrium cracking catalyst to produce catalytically cracked products that are removed as a product and spent catalyst that contains nitrogen-containing coke;
    b. regenerating said spent catalyst in a catalyst regenerator by contact with a controlled amount of air or an oxygen-containing regeneration gas at regeneration conditions to produce regenerated catalyst that is recycled to said cracking reactor and regenerator flue gas;
    c. removing from said regenerator a regenerator flue gas stream comprising:
        less than 1 mole % oxygen;
        at least 0.5 mole % carbon monoxide; and
        volatilized NO$_x$ precursors;
    d. adding additional oxygen or oxygen containing gas to said regenerator flue gas stream to produce oxygen enriched flue gas wherein the molar ratio of carbon monoxide to oxygen in the oxygen enriched flue gas is at least 2:1;
    e. catalytically converting, in a catalytic NO$_x$ precursor conversion means that contains a NO$_x$ precursor conversion catalyst, said volatilized NO$_x$ precursors in said oxygen enriched flue gas and reducing at least 50 mole % of said NO$_x$ precursors to nitrogen.

2. The process of claim 1 wherein said regenerator flue gas contains from 0.5 to 5 mole % CO and said oxygen enriched flue gas contains from 2 to 3 moles of CO per mole of oxygen.

3. The process of claim 1 wherein said regenerator flue gas contains from 0.5 to 5 mole % CO, the CO content is more than twice the oxygen content, molar basis, and said oxygen enriched flue gas contains from 2.0 to 2.25 moles of CO per mole of oxygen.

4. The process of claim 1 wherein said catalytic $NO_x$ precursor conversion means operates with an inlet temperature of 400° to 700° C.

5. The process of claim 1 wherein said catalytic $NO_x$ precursor conversion means operates with an inlet temperature of 450° to 700° C.

6. The process of claim 1 wherein said $NO_x$ precursor conversion catalyst comprises a Group VIII noble metal on a support.

7. The process of claim 6 wherein said metal is selected from the group of Pt, Pd, Rh and mixtures thereof.

8. The process of claim 1 further comprising adding oxygen or oxygen containing gas to the flue gas exiting the catalytic $NO_x$ precursor conversion means and catalytically converting CO to $CO_2$.

9. The process of claim 1 wherein additional oxygen or oxygen containing gas is added to an intermediate portion of said $NO_x$ percursor conversion means.

10. The process of claim 1 wherein additional oxygen or oxygen containing gas is added downstream of said $NO_x$ precursor conversion means.

11. The process of claim 1 wherein regenerator flue gas is cooled upstream of said catalytic $NO_x$ precursor conversion means.

12. The process of claim 1 wherein said cracking process is a fluidized catalytic cracking process.

13. The process of claim 1 wherein said cracking process is a moving bed catalytic cracking process.

14. A fluidized catalytic cracking process for cracking a nitrogen containing hydrocarbon feed comprising:
   a. cracking said feed in a fluidized catalytic cracking (FCC) reactor with a source of regenerated, equilibrium cracking catalyst to produce catalytically cracked products which are removed as a product and spent catalyst containing nitrogen containing coke;
   b. regenerating said spent catalyst in a bubbling fluidized bed catalyst regenerator by contact with a controlled amount of air or an oxygen-containing regeneration gas at regeneration conditions to produce regenerated catalyst which is recycled to said cracking reactor and regenerator flue gas;
   c. removing from said regenerator a regenerator flue gas stream comprising less than 2 mole % oxygen, at least 1 mole % carbon monoxide, volatilized $NO_x$ precursors selected from the group of HCN and $NH_3$, and mixtures; and $NO_x$;
   d. adding additional oxygen or oxygen containing gas to said regenerator flue gas stream to produce oxygen enriched flue gas but limiting said oxygen addition so that the resulting enriched flue gas has at least a 2:1 carbon monoxide:oxygen mole ratio;
   e. catalytically converting in a catalytic $NO_x$ precursor conversion means containing a Group VIII noble metal on a support catalyst at least 50 mole % of said volatilized $NO_x$ precursors to nitrogen to produce flue gas with a reduced $NO_x$ precursor content and carbon monoxide; and
   f. adding oxygen or oxygen containing gas to said flue gas with a reduced $NO_x$ precursor content to form an oxidizing atmosphere and catalytically converting in a downstream stage of said catalytic $NO_x$ precursor at least a portion of said $NO_x$ precursors to nitrogen and oxides of nitrogen and oxidizing at least a majority of carbon monoxide present to carbon dioxide.

15. The process of claim 14 wherein at least 75% of said $NO_x$ precursors are converted in said first stage under reducing conditions, and sufficient additional amounts of said $NO_x$ precursors are catalytically converted in stages downstream of said first stage to convert at least 90 mole % of said $NO_x$ precursors to nitrogen.

16. A fluidized catalytic cracking process for cracking a nitrogen containing hydrocarbon feed comprising:
   a. cracking said feed in a fluidized catalytic cracking (FCC) reactor with a source of regenerated, equilibrium cracking catalyst to produce catalytically cracked products which are removed as a product and spent catalyst containing nitrogen containing coke;
   b. regenerating said spent catalyst in a bubbling fluidized bed catalyst regenerator by contact with a controlled amount of an oxygen-containing gas at regeneration conditions including localized oxidizing and localized reducing zone to produce regenerated catalyst which is recycled to said cracking reactor and regenerator flue gas;
   c. removing from said regenerator a regenerator flue gas stream comprising less than 1 mole % oxygen, at least 1 mole % carbon monoxide, volatilized $NO_x$ precursors and $NO_x$;
   d. adding additional oxygen or oxygen containing gas to said regenerator flue gas stream to produce oxygen enriched flue gas but limiting said oxygen addition so that the resulting enriched flue gas has at least a 2:1 carbon monoxide:oxygen mole ratio; and
   e. catalytically converting said enriched flue gas in a reactor containing a Group VIII noble metal on a support at least 50 mole % of said volatilized $NO_x$ precursors to nitrogen and converting at least 25% of said $NO_x$ to nitrogen to produce treated flue gas with a reduced $NO_x$ precursor content and a reduced $NO_x$ content.

17. The process of claim 16 wherein said Group VIII noble metal is rhodium.

18. A fluidized catalytic cracking process for cracking a nitrogen containing hydrocarbon feed comprising:
   a. cracking said feed in a fluidized catalytic cracking (FCC) reactor with a source of regenerated, equilibrium cracking catalyst to produce catalytically cracked products which are removed as a product and spent catalyst containing nitrogen containing coke;
   b. regenerating said spent catalyst in a bubbling fluidized bed catalyst regenerator by contact with a controlled amount of an oxygen-containing gas at regeneration conditions including localized oxidizing and localized reducing zone to produce regenerated catalyst which is recycled to said cracking reactor and regenerator flue gas;
   c. removing from said regenerator a regenerator flue gas stream comprising less than 1 mole % oxygen, at least 1 mole % carbon monoxide, volatilized $NO_x$ precursors and $NO_x$;
   d. adding additional oxygen or oxygen containing gas to said regenerator flue gas stream to produce oxygen enriched flue gas but limiting said oxygen addition so that the resulting enriched flue gas has at least a 2:1 carbon monoxide:oxygen mole ratio; and e. catalytically converting said enriched flue gas in a reactor containing a Group VIII noble metal on a support at least 50 mole % of said volatilized $NO_x$ precursors to nitrogen and converting at least 25% of said $NO_x$ to nitrogen to produce treated flue gas with a reduced $NO_x$ precursor content and a reduced $NO_x$ content and containing CO; and f. adding air or oxygen containing gas to said treated flue gas and thermally converting, in a thermal CO conversion means operating at thermal CO oxidation conditions, said treated flue gas to produce a low CO and low $NO_x$ stack gas.

* * * * *

UNITED STATES PATENT AND TRADEMARK OFFICE
CERTIFICATE OF CORRECTION

PATENT NO. : 5,830,346
DATED : November 3, 1998
INVENTOR(S) : Mohsen N. Harandi, et al.

It is certified that error appears in the above-identified patent and that said Letters Patent is hereby corrected as shown below:

In the claims:
Column 23, line 11, change "700" to --600--.

Signed and Sealed this

Twenty-third Day of February, 1999

Attest:

Q. TODD DICKINSON

*Attesting Officer*    *Acting Commissioner of Patents and Trademarks*